(12) United States Patent
Muller et al.

(10) Patent No.: US 6,517,734 B1
(45) Date of Patent: Feb. 11, 2003

(54) GRATING FABRICATION PROCESS USING COMBINED CRYSTALLINE-DEPENDENT AND CRYSTALLINE-INDEPENDENT ETCHING

(75) Inventors: Lilac Muller, Boulder, CO (US); Kenneth Edmund Arnett, Boulder, CO (US); Larry Fabiny, Boulder, CO (US); Kristofer Stefan Josef Pister, Orinda, CA (US)

(73) Assignee: Network Photonics, Inc., Boulder, CO (US)

( * ) Notice: Subject to any disclaimer, the term of this patent is extended or adjusted under 35 U.S.C. 154(b) by 193 days.

(21) Appl. No.: 09/669,758

(22) Filed: Sep. 26, 2000

Related U.S. Application Data

(63) Continuation-in-part of application No. 09/615,300, filed on Jul. 13, 2000.

(51) Int. Cl.[7] .......................... G02B 5/18; H01L 21/306
(52) U.S. Cl. .............................. 216/24; 216/39; 216/57; 216/67; 216/72; 216/79; 216/88; 216/99; 204/192.34
(58) Field of Search ....................... 216/24, 39, 41, 216/49, 57, 67, 72, 79, 88, 99; 204/192.34

(56) References Cited

U.S. PATENT DOCUMENTS

| 4,330,175 A | * | 5/1982 | Fujii et al. ................... 359/571 |
| 5,080,465 A | * | 1/1992 | Laude ........................... 216/24 |
| 5,279,924 A | | 1/1994 | Sakai et al. .................. 430/290 |
| 5,414,540 A | | 5/1995 | Patel et al. .................... 359/94 |
| 5,492,607 A | * | 2/1996 | Yap ........................ 204/192.34 |
| 5,917,625 A | | 6/1999 | Ogusu et al. ................ 359/130 |
| 6,097,863 A | | 8/2000 | Chowdhury .................. 385/37 |
| 6,200,711 B1 | * | 3/2001 | Kurihara et al. ................ 430/5 |
| 2001/0003035 A1 | * | 6/2001 | Ozarski et al. ............. 430/321 |

FOREIGN PATENT DOCUMENTS

| EP | 198199 A2 | * | 10/1986 | ......... H01L/21/306 |
| JP | 55134806 A | * | 10/1980 | ............. G02B/5/18 |
| JP | 58076804 A | * | 5/1983 | ............. G02B/5/18 |
| JP | 58091407 A | * | 5/1983 | ............. G02B/5/18 |
| JP | 61080822 A | * | 4/1986 | ......... H01L/21/302 |
| JP | 01238180 A | * | 9/1989 | ............. H01S/3/18 |
| JP | 02199401 A | * | 8/1990 | ............. G02B/5/18 |
| JP | 2000-89011 | | 3/2000 | |

OTHER PUBLICATIONS

U.S. patent application Ser. No. 09/442,061, Weverka et al., filed Nov. 16, 1999.
U.S. patent application Ser. No. 09/615,300, Fabiny et al., filed Jul. 13, 2000.
"Low Voltage Piezoelectric Stacks," Transducer Elements, Catalog #3 1998, pp. 30–45, Piezo Systems, Inc. Cambridge, MA 02139.

(List continued on next page.)

*Primary Examiner*—Anita Alanko
(74) *Attorney, Agent, or Firm*—Townsend and Townsend and Crew LLP

(57) ABSTRACT

A diffraction grating is fabricated by forming two sets of parallel trenches in a crystal surface, one set with a crystalline-independent etching technique and the other made with a chemically crystalline-dependent etchant. The intersection of the two sets of trenches removes material from the crystal surface to produce an etched crystal surface that can be coated with a reflective material to form the diffraction grating or can be used as a master for batch fabrication of diffraction gratings.

39 Claims, 17 Drawing Sheets

OTHER PUBLICATIONS

Nishi, I. et al., "Broad–passband–width optical filter for multi/demultiplexer using a diffraction grating and a retroreflector prism," *Electronic Letters*, vol. 21(10), pp. 423–424 (May 9, 1985).

Sun, Z.J. et al, "Demultiplexer with 120 channels and 0.29–nm channel spacing," *IEEE Photonics Technology Letters*, vol. 10(1), pp. 90–92 (Jan. 1998).

Philippe, P. et al, "Wavelength demultiplexer: using echelette gratings on silicon substrate," *Applied Optics*, vol. 24(7), pp. 1006–1011 (Apr. 1, 1985).

Graf, U.U. et al, "Fabrication and evaluation of an etched infrared diffraction grating," *Applied Optics*, vol. 33(1), pp. 96–102 (Jan. 1, 1994).

Keller, L.D. et al, "Fabrication and testing of chemically micromachined silicon echelle gratings," *Applied Optics*, vol. 39(7), pp. 1094–1105 (Mar. 1, 2000).

Smith, M.S. et al, "Diffraction gratings utilizing total internal reflection facets in littrow configuration," *IEEE Photonics Technology Letters*, vol. 11(1), pp. 84–86 (Jan. 1999).

Shams, M. K., et al, "Preferential chemical etching of blazed gratings in (110)–oriented GaAs," *Optical Society of America*, pp. 96–98 (Mar. 1979) vol. 4, No. 3.

M. Schilling, et al, "Deformation–free overgrowth of reactive ion beam etched submicron structures in InP by liquid phase epitaxy," *Appl. Phys. Lett 49*, (12) pp. 710–712 (Sep. 22, 1986).

Koch, T.L, et al, "Anisotropically etched deep gratings for InP/InGaAsP optical devices," *J. Appl. Phys. 62*, (8) pp. 3461–3463, (Oct. 15, 1987).

Ciarlo, Dino R., "A latching accelerometer fabricated by the anisotropic etching of (110) oriented silicon wafers," *IOP Publishing Ltd.*, (Mar. 1, 1992) Journal of micromechanics and microengineering, vol. 2, pp 10–13.

Bean, Kenneth E., "Anisotropic Etching of Silicon, *IEEE Transactions on Electron Devices*," vol. Ed–25, No. 10, pp. 1185–1193, (Oct. 1978).

* cited by examiner

GRATING FABRICATION PROCESS USING COMBINED CRYSTALLINE-DEPENDENT AND CRYSTALLINE-INDEPENDENT ETCHING

CROSS-REFERENCES TO RELATED APPLICATIONS

This application is a continuation-in-part application of application Ser. No. 09/615,300 entitled "DIFFRACTION GRATING WITH REDUCED POLARIZATION-DEPENDENT LOSS," filed Jul. 13, 2000, by Larry Fabiny and Tony Sarto, the disclosure of which is incorporated herein by reference for all purposes.

BACKGROUND OF THE INVENTION

This application relates generally to a method and apparatus for diffracting light, and more specifically to a diffraction grating useful in various applications, such as optical telecommunications, that require high diffraction efficiency in multiple polarization orientations.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today, DWDM systems using up to 80 channels are available from multiple manufacturers, with more promised in the future.

Optical wavelength routing functions often use demultiplexing of a light stream into its many individual wavelengths, which are then optically directed along different paths. Subsequently, different wavelength signals may then be multiplexed into a common pathway. Within such routing devices, the optical signals are routed between the common and individual optical pathways by a combination of dispersion and focusing mechanisms. The focusing mechanism forms discrete images of the common pathway in each wavelength of the different optical signals and the dispersion mechanism relatively displaces the images along a focal line by amounts that vary with the signal wavelength.

Both phased arrays and reflective diffraction gratings may be used to perform the dispersing functions. While phased arrays are adequate when the number of channels carrying different wavelength signals is small, reflective diffraction gratings are generally preferable when large numbers of channels are used. However, reflective diffraction gratings tend to exhibit greater polarization sensitivity and since the polarization of optical signals often fluctuates in optical communication systems, this sensitivity may result in large variations in transmission efficiency. Loss of information is possible unless compensating amplification of the signals is used to maintain adequate signal-to-noise ratios. Although polarization sensitivity may generally be mitigated by increasing the grating pitch of the reflective grating, limitations on the desired wavelength dispersion for signals at optical telecommunication wavelengths preclude an increase in grating pitch sufficient to achieve high diffraction efficiency in all polarization directions.

It is thus desirable to provide a diffraction grating that can achieve high diffraction efficiency without significant polarization sensitivity when used at optical telecommunication wavelengths.

SUMMARY OF THE INVENTION

Embodiments of the present invention provide such a diffraction grating, achieving high diffraction efficiency in all polarization states when used for diffraction of an optical signal at telecommunications wavelengths. The diffraction grating in such embodiments includes a plurality of spaced triangular protrusions on a substrate in which reflective faces are blazed at angles $\theta_b$ that are substantially different from the Littrow condition.

Thus, in one embodiment of the invention, the diffraction grating is configured to diffract an optical signal of wavelength λ. It has a substrate and a plurality of reflective faces oriented at respective blaze angles $\theta_b$ spaced along the substrate surface at a grating density 1/d. The blaze angles $\theta_b$ substantially differ from the Littrow condition $\sin \theta_b = \lambda/2d$. Each of these reflective faces is supported by a support wall that is connected with the substrate surface such that the optical signal is reflected essentially only off the reflective faces and not off the support walls. Since the optical signal is reflected off the reflective faces but not the support walls, the diffraction efficiency of certain polarization states is improved.

In particular embodiments, the support walls are connected substantially normal with the surface of the substrate and in other embodiments they are connected at an obtuse angle with the substrate. The blaze angles are preferably within the range $50° \leq \theta_b \leq 70°$ and more preferably within the range $50° \leq \theta_b \leq 60°$. The density at which the reflective faces are spaced along the substrate is preferably between 700 and 1100 faces/mm and more preferably between 800 and 1000 faces/mm.

In a certain embodiment, the reflective faces are equally spaced along the surface of the substrate at density 1/d between 800 and 1000 faces/mm without exposing the surface of the substrate, with each of the blaze angles $\theta_b$ substantially equal to 54.0°. In another embodiment, the reflective faces are equally spaced along the surface of the substrate at density l/d between 800 and 1000 faces/mm such that a portion of the surface of the substrate is exposed between each such reflective face, with each of the blaze angles $\theta_b$ substantially equal to 55.8°. In that embodiment, the support walls preferably have an altitude between 1200 and 1400 nm, more preferably substantially equal to 1310 nm.

According to embodiments of the invention, the diffraction grating is fabricated by forming two sets of parallel trenches in a crystal surface, one made with a crystalline-independent etching technique and the other made with a crystalline-dependent chemical etchant. The intersection of the two sets of trenches removes material from the crystal surface to produce an etched crystal surface that can be coated with a reflective material to form the diffraction grating or can be used as a master for batch fabrication of diffraction gratings.

In a particular embodiment, the first set of parallel trenches is initially formed perpendicularly from a surface of a silicon wafer. This set of trenches is then filled with a sacrificial material that also coats the surface of the wafer. The sacrificial material is subsequently patterned lithographically to expose the underlying wafer, with the crystalline-dependent chemical etchant being applied at the exposed portions. The deposited sacrificial material acts as an etch stop to the chemical etchant. Appropriate techniques for forming the first set of parallel trenches include reactive ion etching, deep reactive ion etching, and ion milling. Appropriate crystalline-dependent chemical etchants that preferentially stop etches along [111] orientations include KOH, hydrazine, and ethylene diamine pyrocatechol.

In another embodiment, plurality of parallel trenches are formed in a crystal surface with a crystalline-independent technique. Sacrificial material is deposited in each of the plurality of trenches, with some of the sacrificial material also being deposited on the crystal surface. The excess sacrificial material is removed from the crystal surface, such as by chemical and mechanical polishing (CMP). Subsequently, the crystal surface is exposed to a crystalline-dependent etchant. The resulting structure may be used for fabrication of the diffraction grating. Alternatively, the remaining sacrificial material may be removed from the structure before finalizing the grating fabrication.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components.

DESCRIPTION OF THE SPECIFIC EMBODIMENTS

1. Introduction

The following description sets forth embodiments of a diffraction grating that simultaneously achieves high efficiency in multiple polarization states for a high groove density at optical telecommunications wavelengths. Embodiments of the invention can thus be used with a wavelength router to achieve the goals of optical networking systems.

The general functionality of one such optical wavelength router that can be used with embodiments of the invention is described in detail in the copending, commonly assigned U.S. patent application, filed Nov. 16, 1999 and assigned Ser. No. 09/442,061, entitled "Wavelength Router," which is herein incorporated by reference for all purposes. As described therein, such an optical wavelength router accepts light having a plurality of spectral bands at an input port and selectively directs subsets of the spectral bands to desired ones of a plurality of output ports. Light entering the wavelength router from the input port forms a diverging beam, which includes the different spectral bands. The beam is collimated, such as by a lens, and directed to a diffraction grating that disperses the light so that collimated beams at different wavelengths are directed at different angles. The high efficiency achieved by the diffraction grating in multiple polarization states translates directly into improved efficiency in operation of the wavelength router. Other uses for the diffraction grating where high efficiency is desirable in multiple polarization states will be similarly evident to those of skill in the art.

2. Diffraction of Optical Signals

Figure 1A:
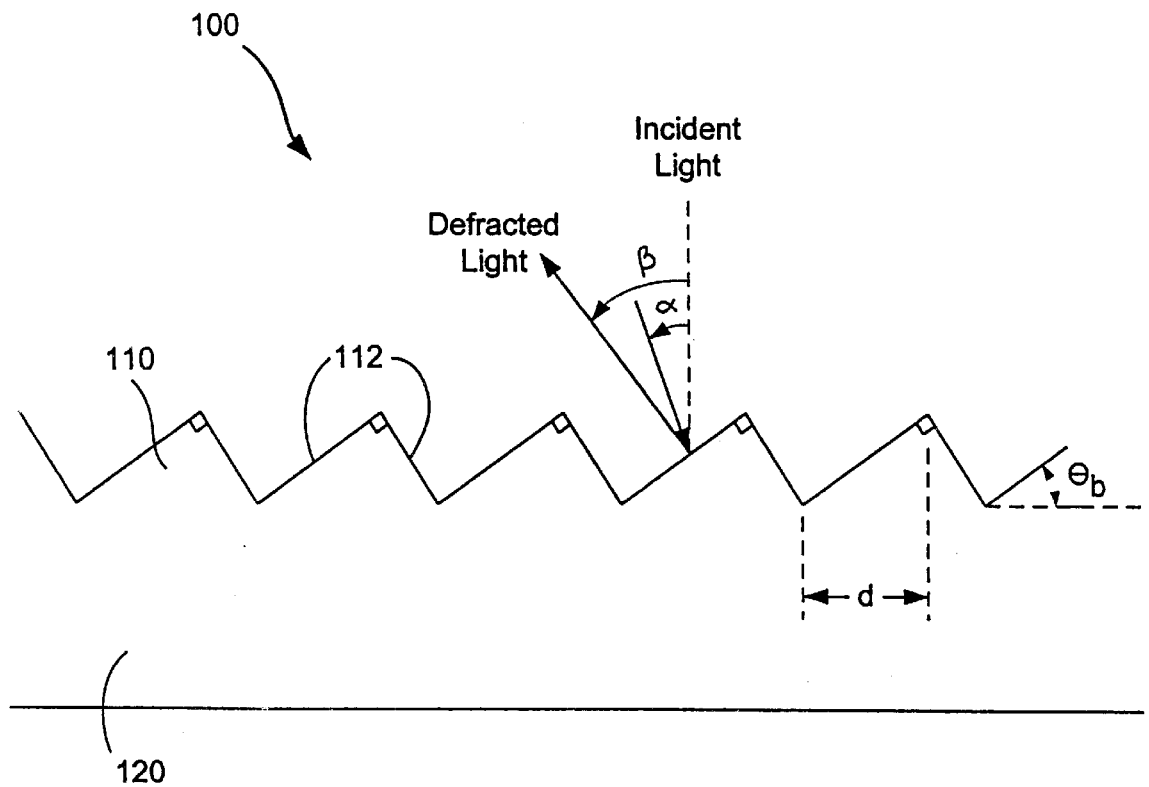
FIG. 1(a) illustrates a right-apex-angle diffraction grating.

Demultiplexing of an optical signal that contains a plurality of signals at different wavelengths may be accomplished with a diffraction grating with appropriately sized and shaped diffraction grooves. An example of such a demultiplexing diffraction grating is illustrated in FIG. 1(a). When illuminated at an angle α from the normal, the grating 100 directs light with wavelength λ toward angle β in accordance with the formula $$m\lambda = d(\sin \alpha \pm \sin \beta),$$

where m is an integral order of interference and d is the grating period. The manner in which incident light will be distributed among the various orders of interference depends on the shape and orientation of the groove sides and on the relation of wavelength to groove separation. When d<λ, diffraction effects predominate in controlling the intensity distribution among orders, but when d>λ, optical reflection from the sides of the grooves is more strongly involved.

Diffraction gratings 100 are manufactured classically with the use of a ruling engine by burnishing grooves with a diamond stylus in a substrate 120 or holographically with the use of interference fringes generated at the intersection of two laser beams. For high dispersion with operational wavelengths in the range 1530–1570 nm, commonly used in optical telecommunications applications, a line density (=1/d) between about 700 and 1100 faces/mm is desirable. It is further possible to "blaze" a grating by ruling its grooves to produce multiple reflective faces 112 that reflect a large fraction of the incoming light of suitably short wavelengths in one general direction. In general, a blazed grating has been understood to refer to one in which the grooves of the diffraction grating are controlled so that the reflective faces 112 form one side of right-apex triangles 110, inclined to the substrate surface with an acute blaze angle $\theta_b$. Obtuse apex angles up to ~110° are sometimes present in blazed holographic gratings.

High efficiency is achieved when blazed grating groove profiles are prepared in the Littrow configuration, in which incident and diffracted rays are autocollimated so that $\alpha=\beta=\theta_b$. In this Littrow configuration, the diffraction equation for blaze angle $\theta_b$ thus takes the simple form $$\sin\theta_b = \frac{m\lambda}{2d}.$$

For a Littrow grating with line density 1/d 900 faces/mm, the preferred blaze angle at telecommunications wavelengths is $\theta_b \approx 44.2°$ (i.e. the blaze wavelength in first order is $\lambda_b=2d\sin\theta_b \approx 1550$ nm). With this configuration, however, significant differences are found in the reflection efficiencies for different polarization states. In particular, the diffraction efficiency for an S polarization state (also described as a TM polarization state), in which the electric field is polarized orthogonal to the grating grooves, is >90%. Typically, however, there is only 30–50% efficiency for a P polarization state (also described as a TE polarization state), in which the electric field is polarized parallel to the grating grooves. This relatively poor diffraction efficiency for the P polarization state is a consequence of boundary conditions imposed on the electric field as it propagates parallel to the groove edge in the grating.

3. High-Efficiency Polarization-Independent Reflective Diffraction Grating

Figure 1B:
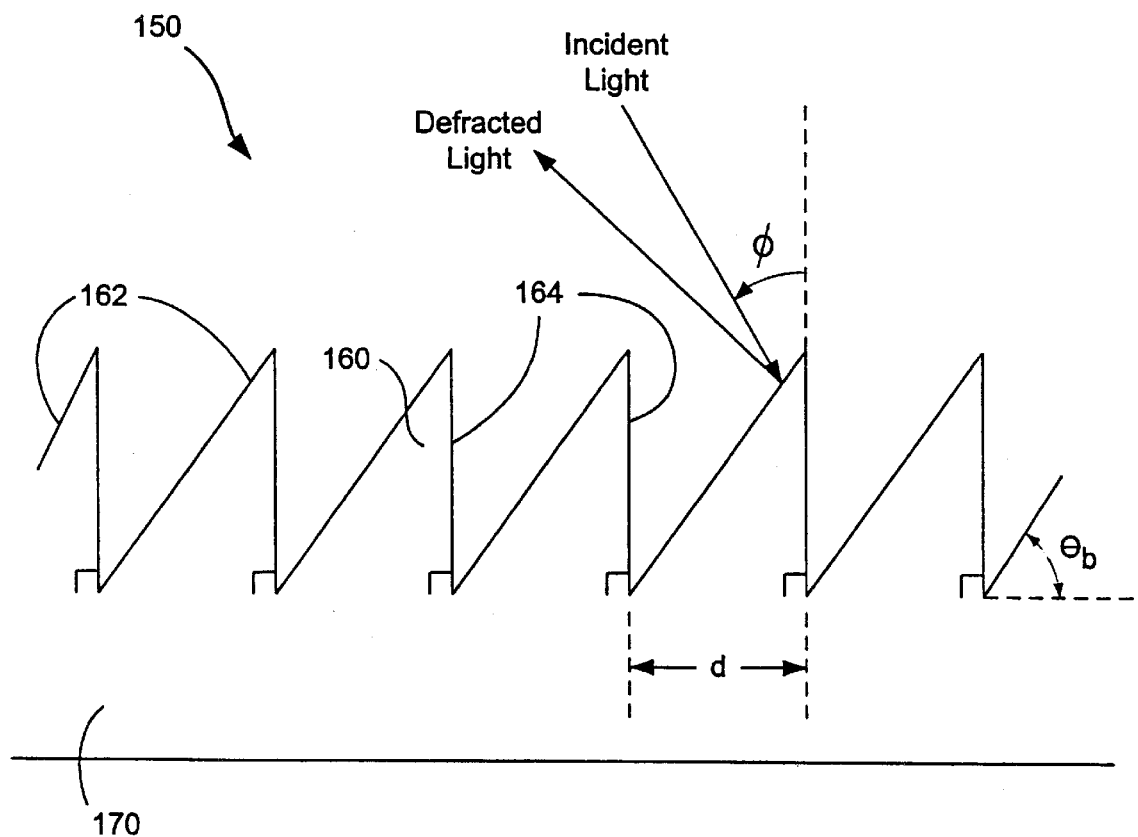
FIG. 1(b) illustrates the shape of a diffraction grating according to a full-sawtooth embodiment of the invention.

FIG. 1(b) illustrates a first set of embodiments of the invention (referred to herein as the "full-sawtooth" embodiments), which provide a high diffraction efficiency for optical signals at telecommunications wavelengths in both S and P polarization states. In the specific full-sawtooth embodiment illustrated in FIG. 1(b), the diffraction grating 150 includes multiple reflective faces 162 formed in a substrate 170, each inclined at blaze angle $\theta_b$ to the substrate surface. Each reflective face 162 is supported by a support wall 164 that is connected substantially normal with the substrate 170. As a result, the diffraction grating 150 has a sawtooth configuration formed in the substrate 170 from multiple right-base triangular protrusions.

In the illustrated embodiment, each of the reflective faces 162 is equally spaced along the surface of the substrate 170, with each reflective face 162 extending through a full spacing period. The full-sawtooth embodiment is characterized by the absence of exposure of the substrate 170 at the base of the triangles 210 to incident light—the support wall 164 supporting each reflective face 162 is also connected to the adjacent reflective face. In alternative embodiments of the full-sawtooth configuration, the reflective faces 162 are not equally spaced. High reflectivity of the reflective faces 162 is achieved in one embodiment by coating the diffraction grating 150 with gold. In alternative embodiments, different reflective coatings, such as aluminum, are used. Further, although FIG. 1(b) shows the grating to be configured on a flat substrate 170, the invention more generally includes the use of curved substrates.

While the grating configuration shown in FIG. 1(a) with right-apex triangles 110 permits reflection of incident light from the side of the triangle 110 opposite the blaze angle $\theta_b$, the full-sawtooth configuration using right-base triangles 160 shown in FIG. 1(b) substantially restricts reflection to be from the reflective faces 162. As a result, there is a significant reduction in boundary effects for P-polarized light as the electric field passes the apex of one triangle 160 and reflects off the adjacent reflective face 162. More generally, the support wall 164 is connected non-normally with the substrate 170, preferably forming an obtuse angle so that the characteristic of limiting reflection of incident light essentially only off the reflective faces 162 and not off the support walls 164 is maintained (see discussion below with regards to FIG. 9). The blaze angle $\theta_b$ at which the reflective faces 162 are inclined to the substrate surface is preferably in the range 50–70°, most preferably in the range 50–60°. At a grating density 1/d=900 faces/mm, which is a suitable value for the 1530–1570 nm wavelength used for optical telecommunications signals, this is preferably $\theta_b \approx 54.0°$. At this blaze angle, the product of the diffraction efficiencies in the S and P polarization configurations is maximized, as discussed below in the context of FIG. 4(a). This blaze angle is essentially different from $\phi \equiv \sin^{-1}\lambda/2d$ (=43.5–45.0°), the angle of incidence at which the grating efficiency is maximized. Thus, maximal grating efficiency for the invention is achieved substantially away from the Littrow condition.

Figure 1C:
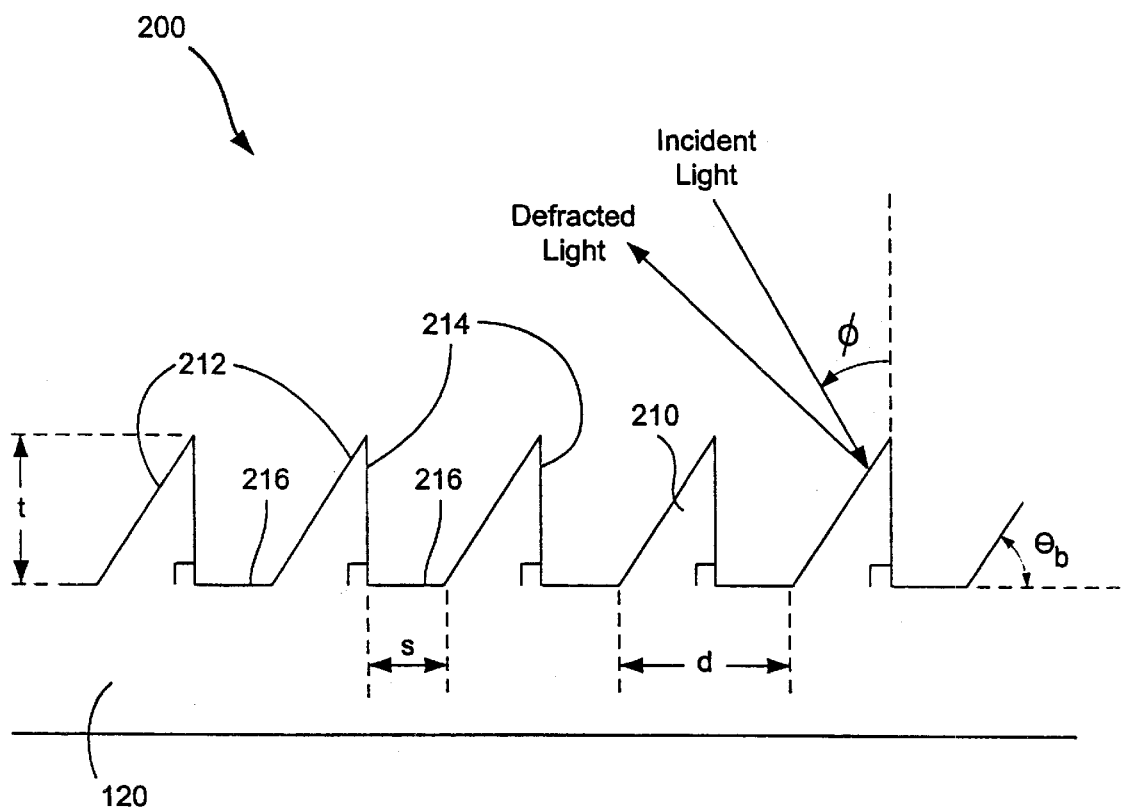
FIG. 1(c) illustrates a the shape of a diffraction grating according to a truncated-sawtooth embodiment of the invention.

A second set of embodiments of the invention (referred to herein as the "truncated-sawtooth" embodiments) is illustrated in FIG. 1(c). In these embodiments, the steep notch of the full-sawtooth embodiments is eliminated. In the particular truncated-sawtooth embodiment illustrated in FIG. 1(c), the diffraction grating 200 includes a plurality of reflective faces 212 each oriented at blaze angle $\theta_b$ with respect to a surface of the substrate 220. Each such reflective face 212 is supported by a support wall 214 that is substantially normally connected with the surface of the substrate. Accordingly, the diffraction grating 200 has a configuration that uses multiple right-base triangles 210, thereby sharing the advantage of the full-sawtooth configuration in which the normal orientation of the support walls 214 mitigates boundary effects for P-polarized light as the electric field of the light passes the apex of one triangle 210 and reflects off an adjacent reflective surface 212. More generally, the support walls 214 connect with the substrate 170 non-normally, preferably forming an obtuse angle so that the characteristic of limiting reflection of incident light essentially only off the reflective faces 162 and not off the support walls 164 is maintained.

While the full-sawtooth embodiments had no exposure of the substrate 170 at the base of the triangles 160, the truncated-sawtooth embodiments permit such exposure. In particular, surface portions 216 of the substrate 220 are exposed. The effect of permitting such exposure allows reduced altitude of right triangles 210. It is evident, however, that the full-sawtooth configuration is a limiting case of the truncated-sawtooth configuration as the altitude of the triangles is increased. For a grating density $1/d=900$ faces/mm, this limit is approached with a triangle altitude of approximately 1635 nm.

In one truncated-sawtooth embodiment, illustrated in FIG. 1(c), each of the reflective faces 212 is equally spaced along the surface of the substrate 220. In alternative embodiments such spacing may be irregular. Also, FIG. 1(c) shows each reflective face 212 extending through substantially half of the spacing period, although other fractions of the spacing period may also be used. In the illustrated embodiment, the blaze angle $\theta_b$ is also preferably in the range 50–70°, most preferably in the range 50–60°. At optical telecommunications wavelengths, 1530–1570 nm, with a grating density $1/d=900$ faces/mm, this is preferably $\theta_b=55.8°$. Again, this optimal blaze angle corresponds to the angle at which the product of diffraction efficiencies in the S and P polarization configurations is maximized, as discussed in the context of FIG. 4(b) below. As for the embodiment illustrated in FIG. 1(b), the maximal efficiency for the grating is achieved substantially away from Littrow conditions since this blaze angle is essentially different from $\phi=\sin^{-1}\lambda/2d$ ($=43.5–45.0°$), the angle of incidence at which the grating efficiency is maximized. Also, as for the first embodiment, the substrate 220 is shown to be flat only for illustrative purposes. More generally, the invention includes the use of a curved substrate.

Additionally, various reflective materials may be used and may be differently applied in various embodiments. For example, in one embodiment, the entire diffraction grating 200 is coated with gold. In alternative embodiments, different reflective coatings, such as aluminum, are used.

4. Diffraction Efficiency of the Specific Embodiments

Various properties of the embodiments described above may be understood by examining the diffraction efficiency achieved by the gratings in various circumstances. The diffraction efficiency of a diffraction grating is generally a function of the wavelength of the optical signal to be diffracted, and is defined as the ratio of the energy of the diffracted wave to the energy of the incident wave: $\epsilon=E_{out}/E_{in}$. As a rough approximation, for Littrow gratings the maximum efficiency is expected at the blaze wavelength $\lambda_b$ with a 50% reduction at 0.7 $\lambda_b$ and 1.8 $\lambda_b$. For telecommunications applications the range in wavelengths, 1530–1570 nm (i.e. 1550±1.3%), is considerably more narrow so that only relatively small variations in efficiency are expected as a function of wavelength. Furthermore, the efficiency in higher orders is expected to follow the general shape of the first-order efficiency curve, although the maximum efficiency generally decreases for each such higher order.

Figure 2:
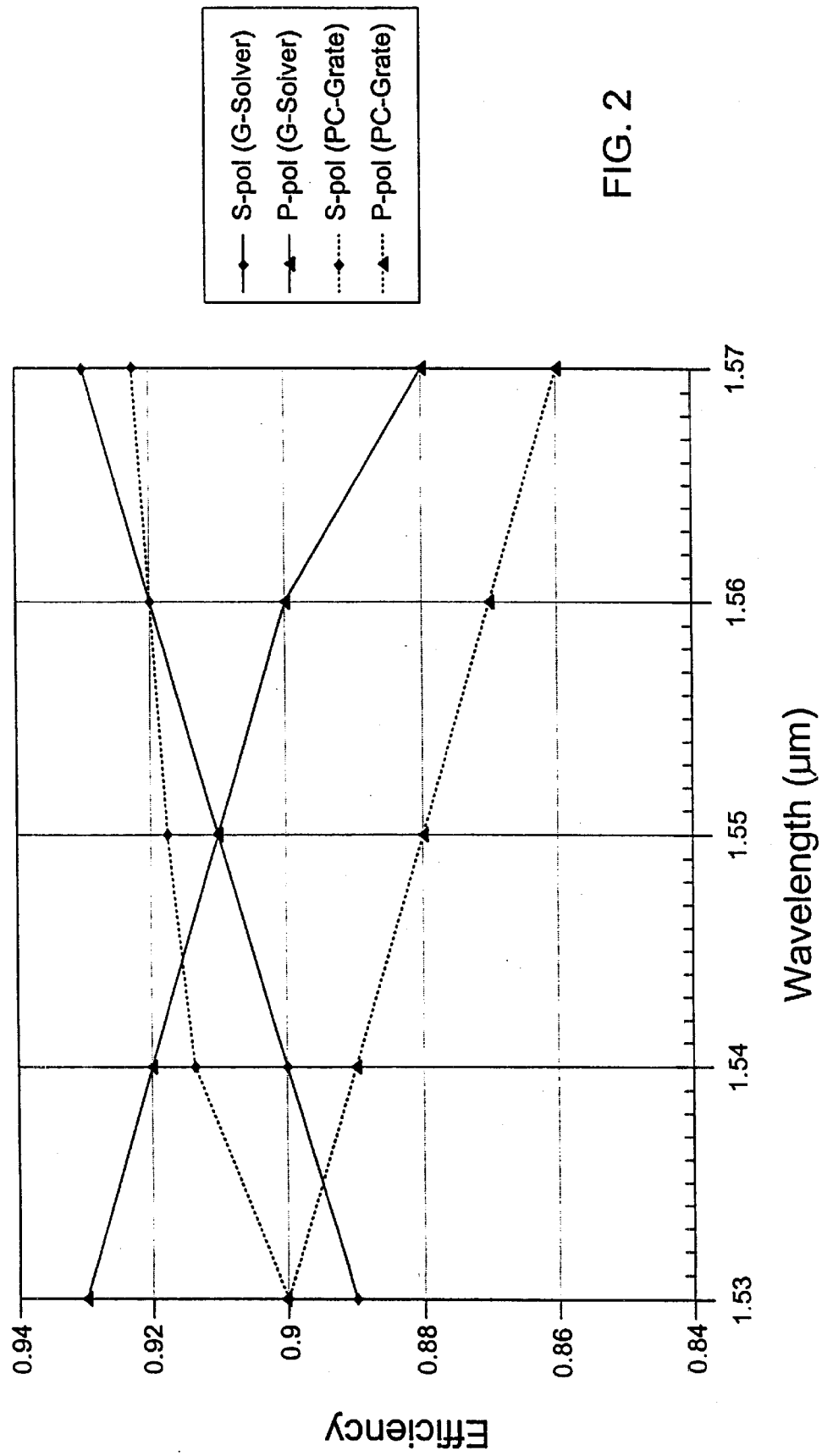
FIG. 2 shows results of numerical simulations of diffraction efficiency profiles for a full-sawtooth embodiment in S and P polarization configurations.
Figure 3:
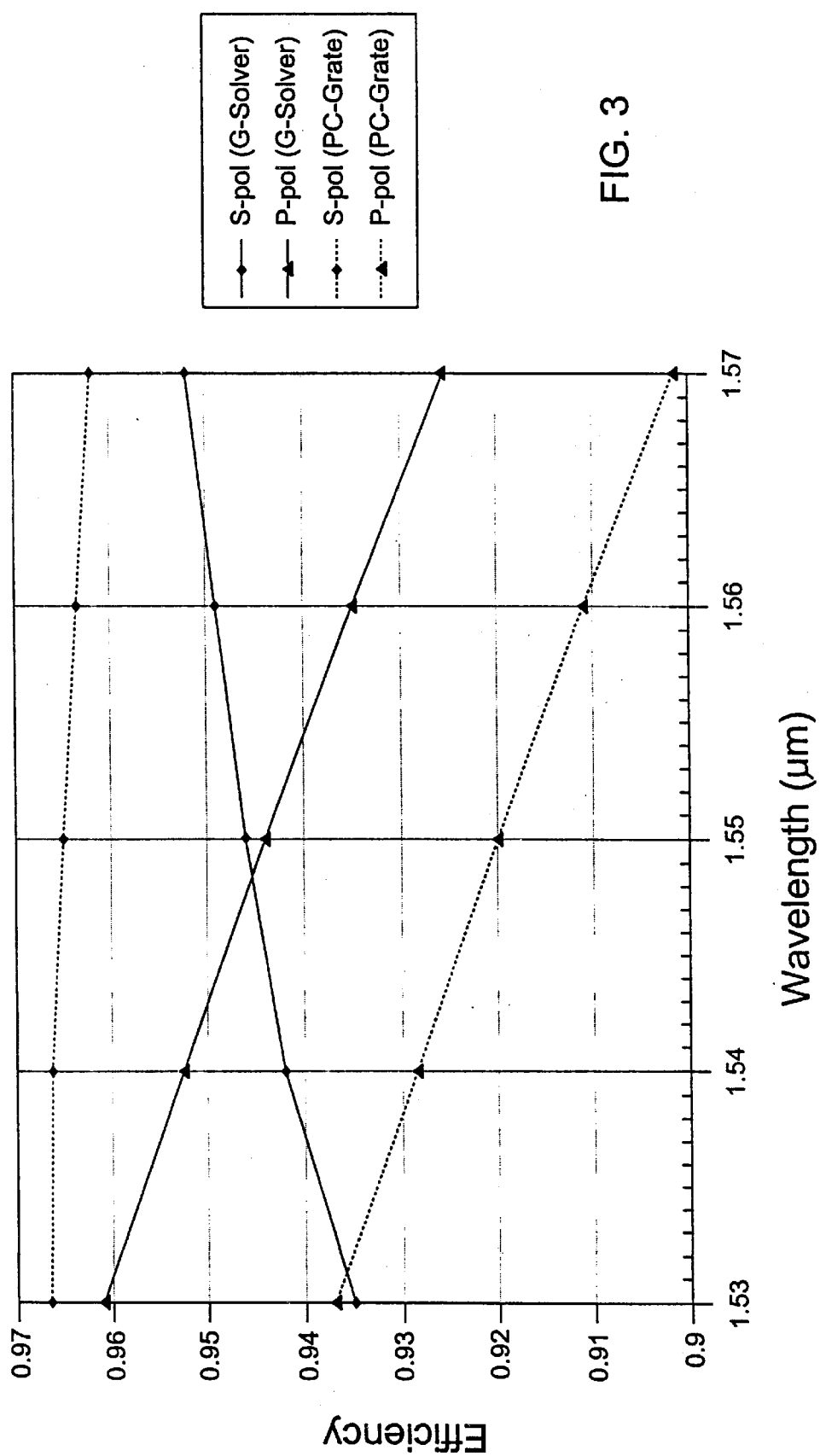
FIG. 3 shows results of numerical simulations of diffraction efficiency profiles for a truncated-sawtooth embodiment in S and P polarization configurations.

Accordingly, FIG. 2 shows the results of calculations of a diffraction efficiency profile in both the S and P polarization configurations for the diffraction grating shown in FIG. 1(b) over a wavelength range of 1530–1570 nm. A similar plot is produced in FIG. 3 for the diffraction grating shown in FIG. 1(c). To evaluate the level of uncertainty of the results, the calculations were performed with two commercially available software packages: G-Solver (solid lines) and PC-Grate (dashed lines). For the calculations discussed below, PC-Grate and G-Solver have generally agreed within about 3% efficiencies, without any observable trend of one estimating higher efficiencies than the other.

Over the entire optical telecommunications wavelength range, the diffraction efficiency exceeds 85% for both S and P polarizations for both the illustrated full-sawtooth and truncated-sawtooth configurations, with approximately less than a ±2% variation over the wavelength range for any given polarization. The explicit comparison of the two numerical packages in FIGS. 2 and 3 highlights their close agreement, with differences no greater than about 3%. Considering the wavelength range of interest and both numerical programs, it can be seen that the invention produces a high diffraction efficiency that is substantially independent of polarization. For the particular full-sawtooth embodiment illustrated in FIG. 1(b), that polarization-independent efficiency is 90±4%. The efficiency is even greater for a truncated-sawtooth embodiment with $\theta_b=55.8°$ and triangle altitude (height of support wall 214) equal to 1310 nm. In that embodiment, the efficiency is 94±4%, i.e. greater than 90% everywhere.

Figure 4A:
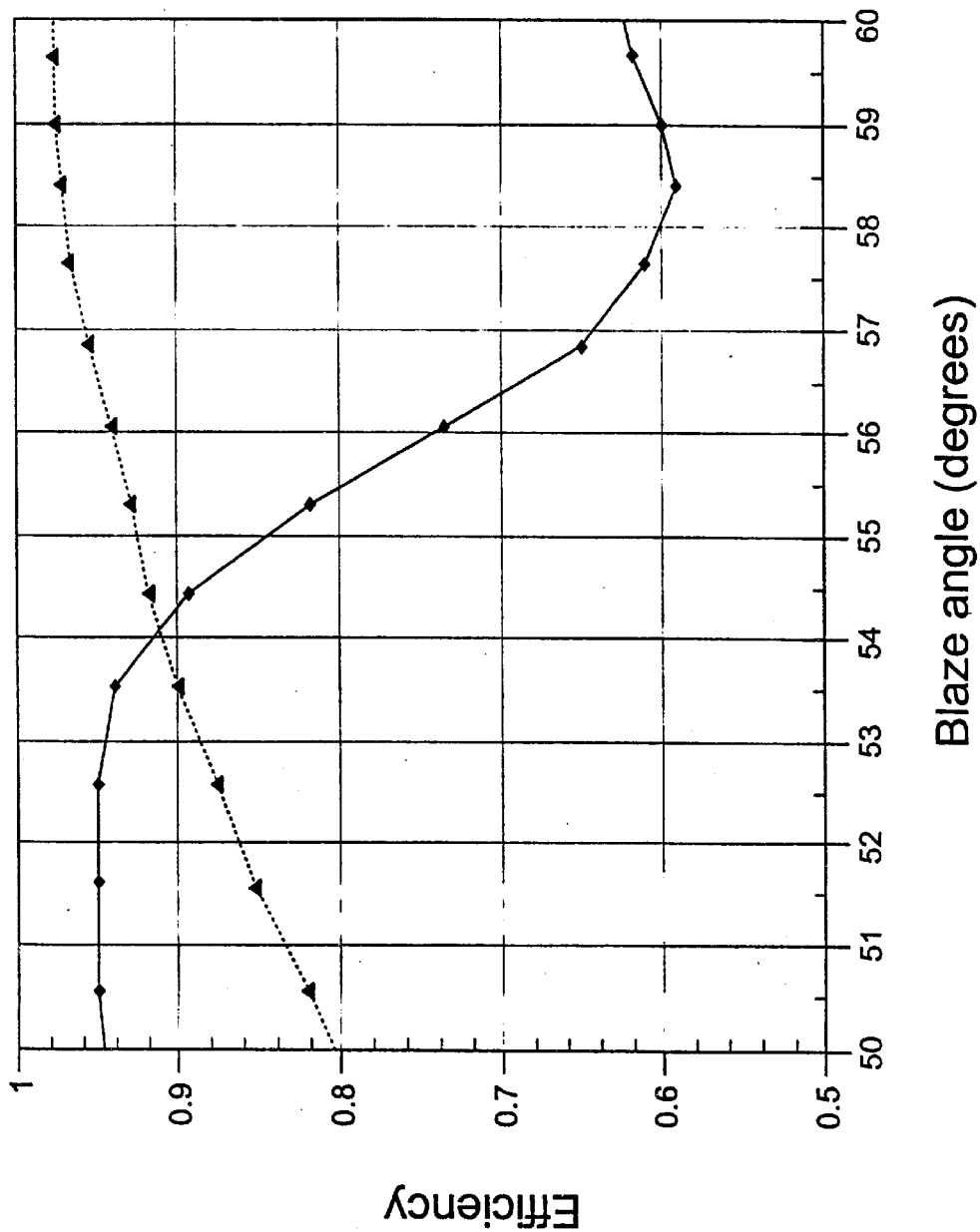
FIG. 4(a) shows numerical results for the efficiency in S and P polarization configurations for a full-sawtooth grating as a function of blaze angle.
Figure 4B:
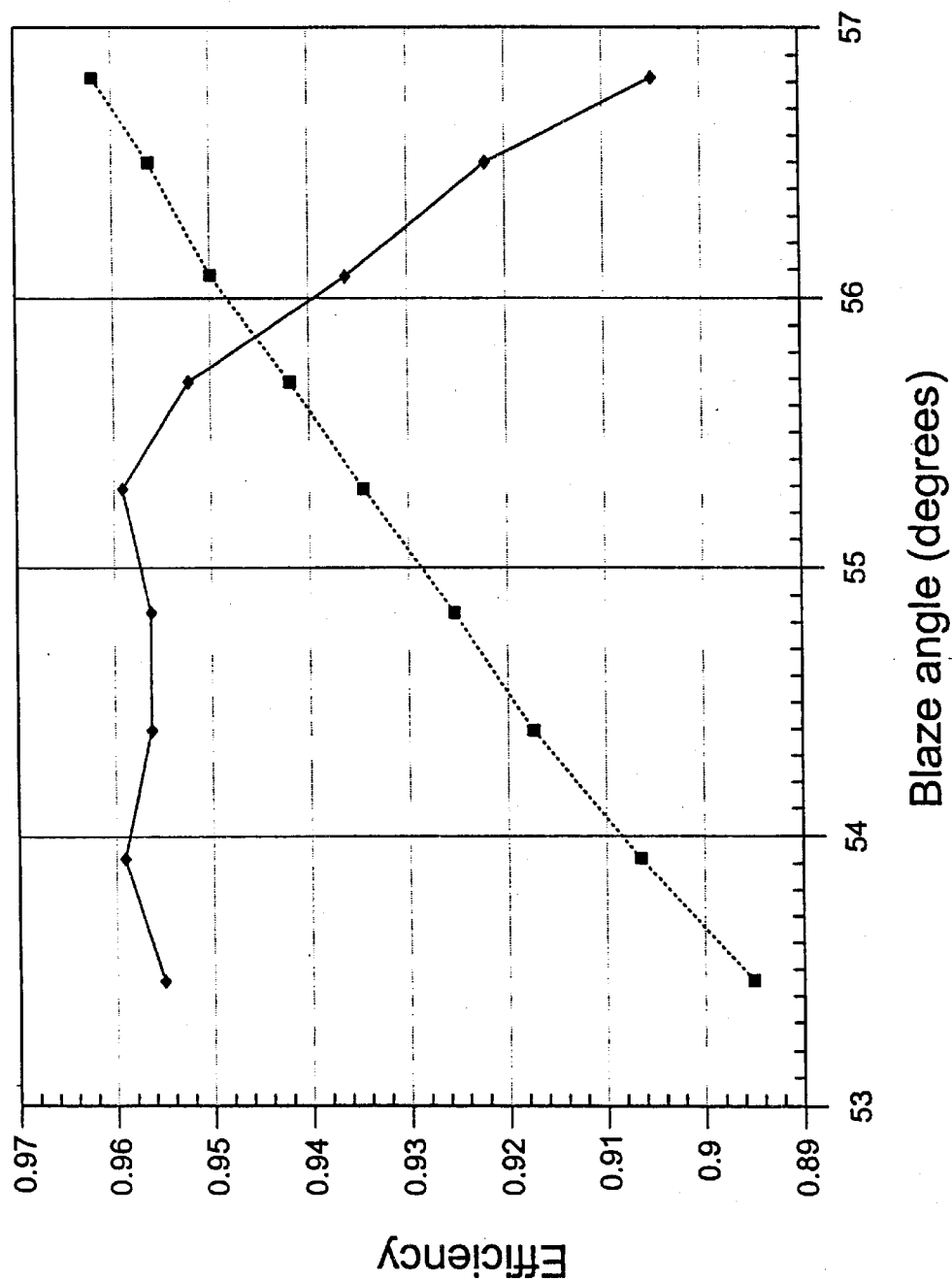
FIG. 4(b) shows numerical results for the efficiency in S and P polarization configurations for a truncated sawtooth grating as a function of blaze angle.

In FIG. 4(a) and FIG. 4(b), an illustration is made of how the numerically calculated diffraction efficiency is used to determine the optimal blaze angle. For the full-sawtooth embodiment, for example, FIG. 4(a) shows the variation in efficiency for both the S and P polarization configurations as a function of blaze angle as calculated with the G-Solver package. For these calculations, a grating density $1/d=900$ faces/mm was used with an angle of incidence for a 1550-nm optical signal of $\phi=45°$. As described above, this particular incident angle $\phi$ is approximately the angle dictated by the Littrow condition. The optimal blaze angle is the angle where the curves for the S and P polarization intersect, i.e. where the product of the two efficiencies is maximized. For the full-sawtooth embodiment, this is seen to occur at $\theta_b=54.0°$. Similarly, FIG. 4(b) shows the efficiencies for S and P polarizations for a truncated-sawtooth embodiment with triangles having an altitude equal to 80% of the maximum possible altitude. Again, the calculations were performed for a grating with grating density $1/d=900$ faces/mm and a 1550-nm optical signal incident at $\phi=45°$. For this grating, the curves cross at the optimal blaze angle $\theta_b=55.8°$.

Figure 5:
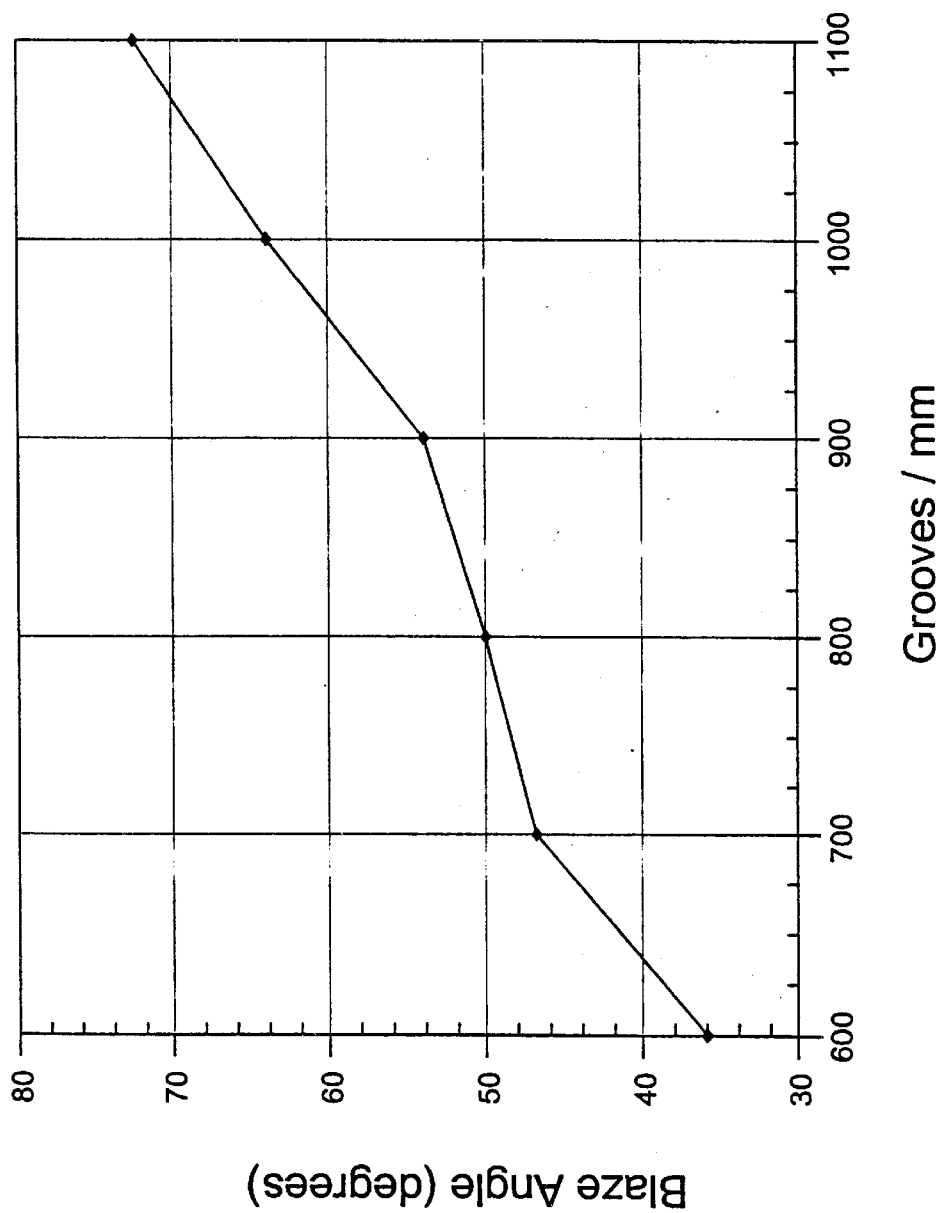
FIG. 5 shows the variation in optimal blaze angle as a function of groove density for a full-sawtooth diffraction grating.

Results are summarized in FIG. 5 of the optimal blaze angle $\theta_b$ for a grating in the full-sawtooth embodiment. The calculations were again performed using the G-Solver package and show how the optimal blaze angle varies as a function of the grating density $1/d$. The calculations were performed for an incident optical signal with wavelength $\lambda=1550$ nm and the incident angle was determined from the Littrow condition for each groove density plotted. The general trend, with the blaze angle increasing monotonically as a function of grating density, is as expected.

Figure 6:
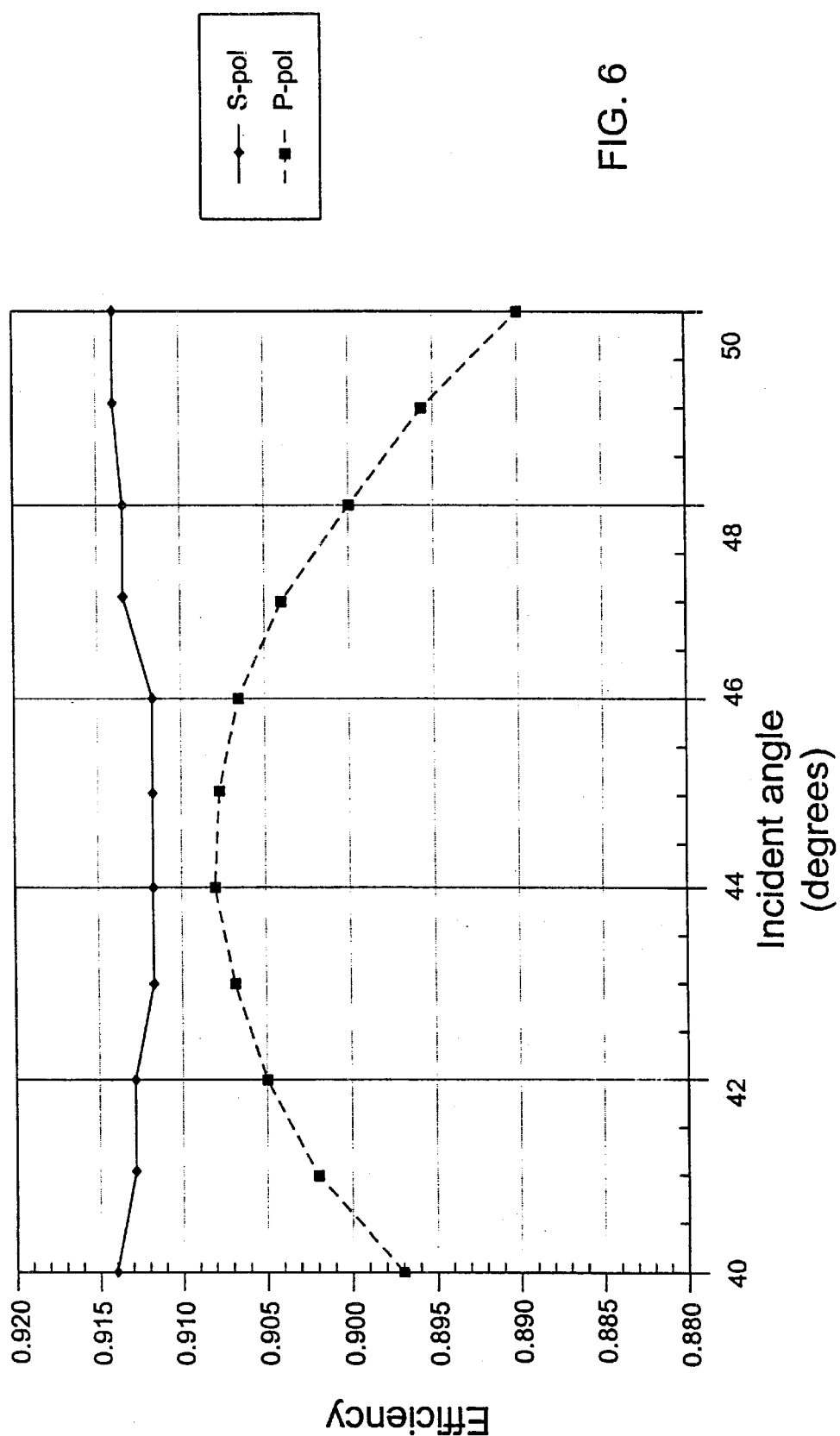
FIG. 6 shows the variation in efficiency in S and P polarization configurations for a full-sawtooth grating as a function of the angle of incidence of the optical signal.

The effect of moving the incident angle away from the Littrow condition is illustrated in FIG. 6. The results of calculations for a full-sawtooth grating using the G-Solver package are shown. The diffraction efficiency was calculated in both S and P polarization configurations for an optical signal with wavelength $\lambda=1550$ nm onto a grating blazed at $\theta_b=54.0°$ with grating density $1/d=900$ faces/mm. The preferred incident angle defined by the Littrow condition is $\phi=44.2°$. While the S-polarization efficiency varies little around this angle, dipping even slightly, the P-polarization efficiency shows a clearly defined maximum at this angle such that the total efficiency is maximized at this incident angle. Although not shown, similar results are also obtained when a truncated-sawtooth grating is used with its optimal blaze angle.

Figure 7A:
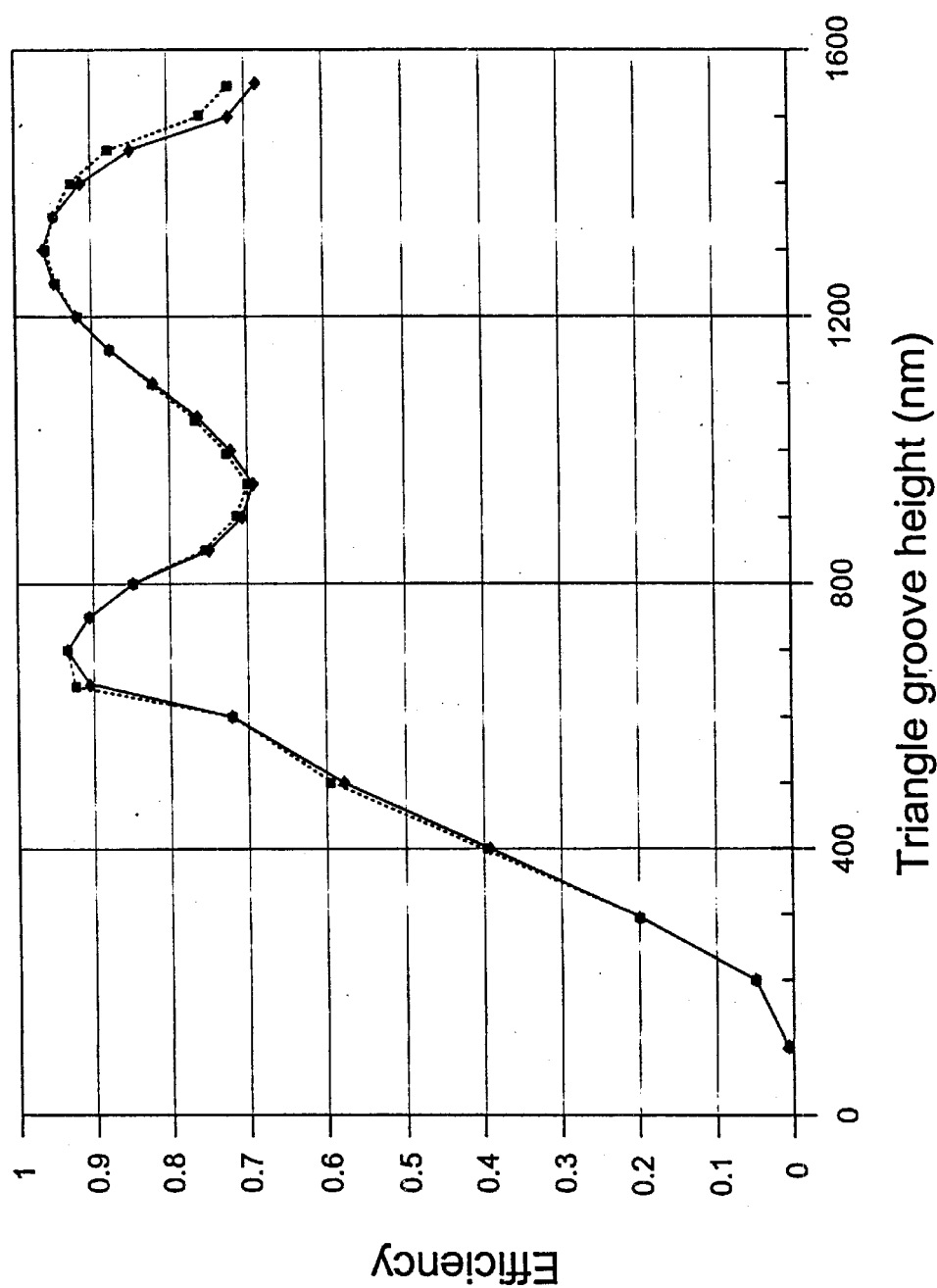
FIG. 7(a) shows results of numerical simulations of diffraction efficiency for a truncated-sawtooth embodiment in an S polarization configuration as a function of triangle groove height.
Figure 7B:
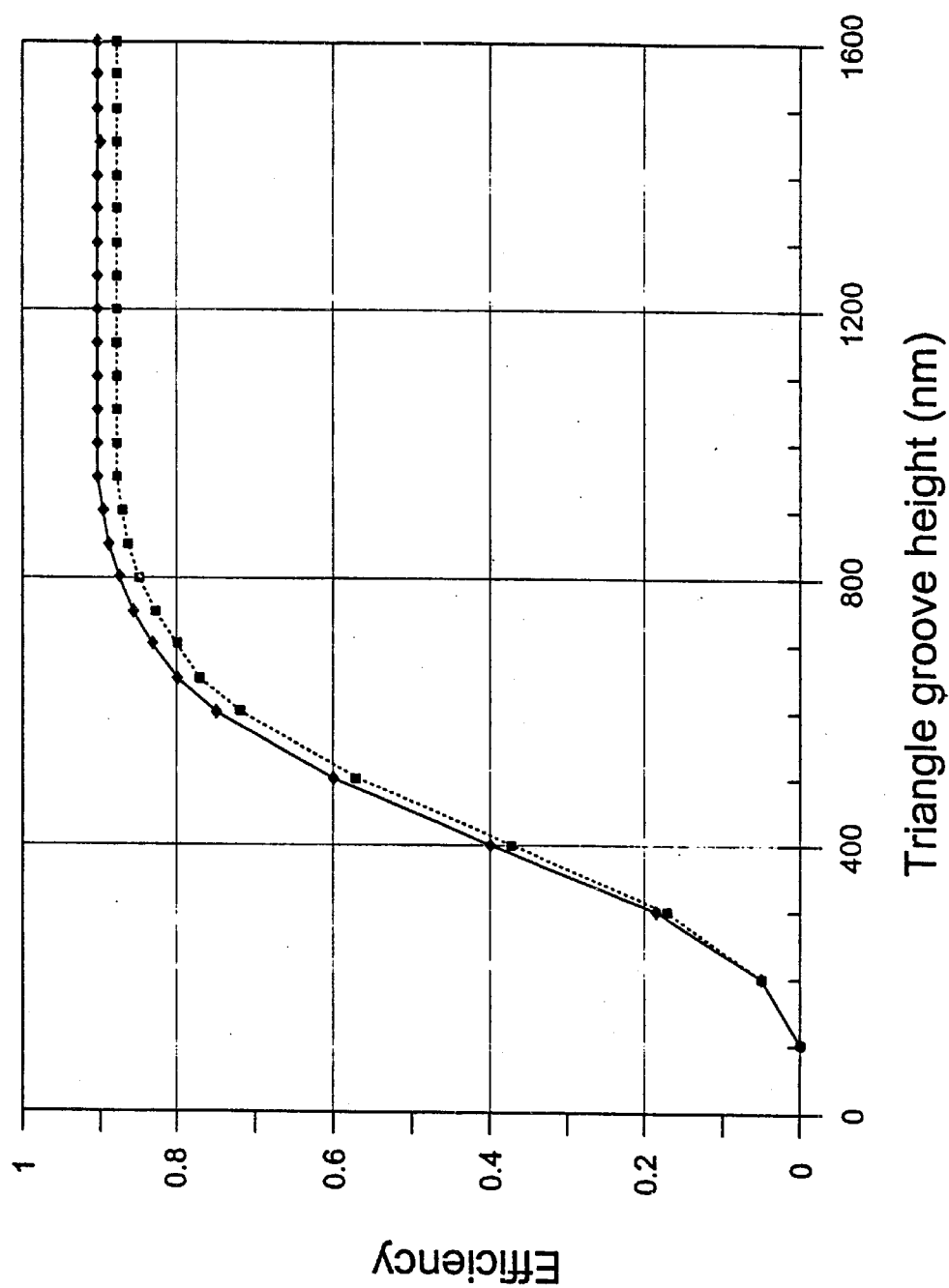
FIG. 7(b) shows results of numerical simulations of diffraction efficiency for a truncated-sawtooth embodiment in a P polarization configuration as a function of triangle groove height.

The variation in efficiency for the truncated-sawtooth embodiments for the S and P polarization states is shown respectively in FIGS. 7(a) and 7(b) as a function of the height of support wall 214. The illustrated results were calculated for a blaze angle $\theta_b=55.8°$ for light incident at $\phi=45°$ with PC-Grate, although similar results are obtained with the G-Solver package. As can be readily seen, the S-polarization efficiency has two local maxima and the P-polarization efficiency exhibits asymptotic behavior. Accordingly, the preferred triangle altitude for the truncated-sawtooth configuration is at the second peak in the S-polarization efficiency, i.e. near 1310 nm.

Figure 8:
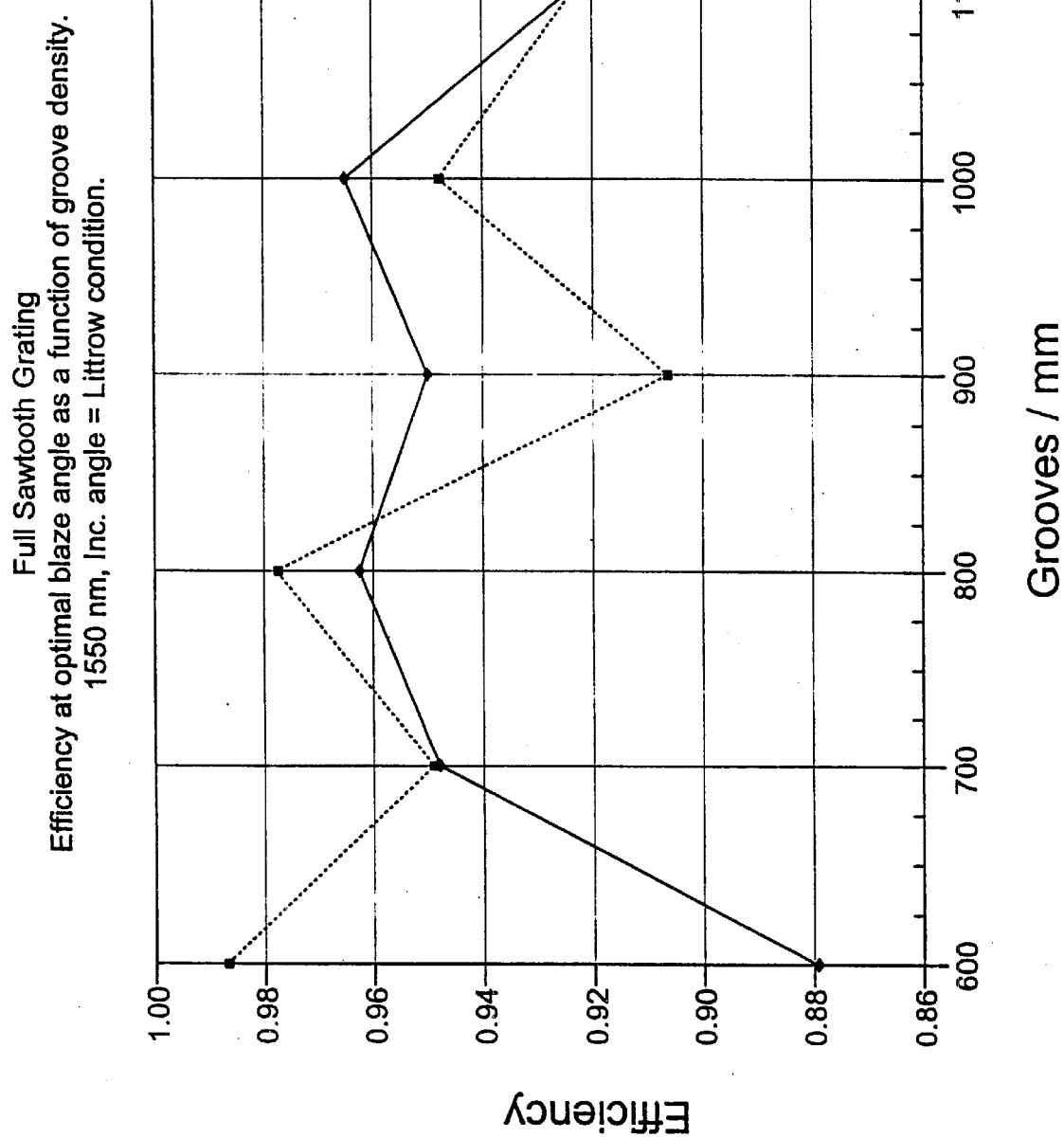
FIG. 8 shows the variation in efficiency in S and P polarization configurations for a full-sawtooth grating at optimal blaze angle as a function of groove density.

FIG. 8 shows that the diffraction efficiency of both S and P polarization states is also dependent on the grating density 1/d. The calculations were performed with the G-Solver package for a full-sawtooth grating with optimal blaze angle $\theta_b$. The incident optical signal had wavelength $\lambda$ and was incident at the angle defined by the Littrow condition. To achieve a diffraction efficiency greater than 90% simultaneously for both the S and P polarizations, it is preferable that the grating density 1/d be between 700 and 1100 faces/mm. More preferably, the grating density is between 800 and 1000 faces/mm.

Figure 9:
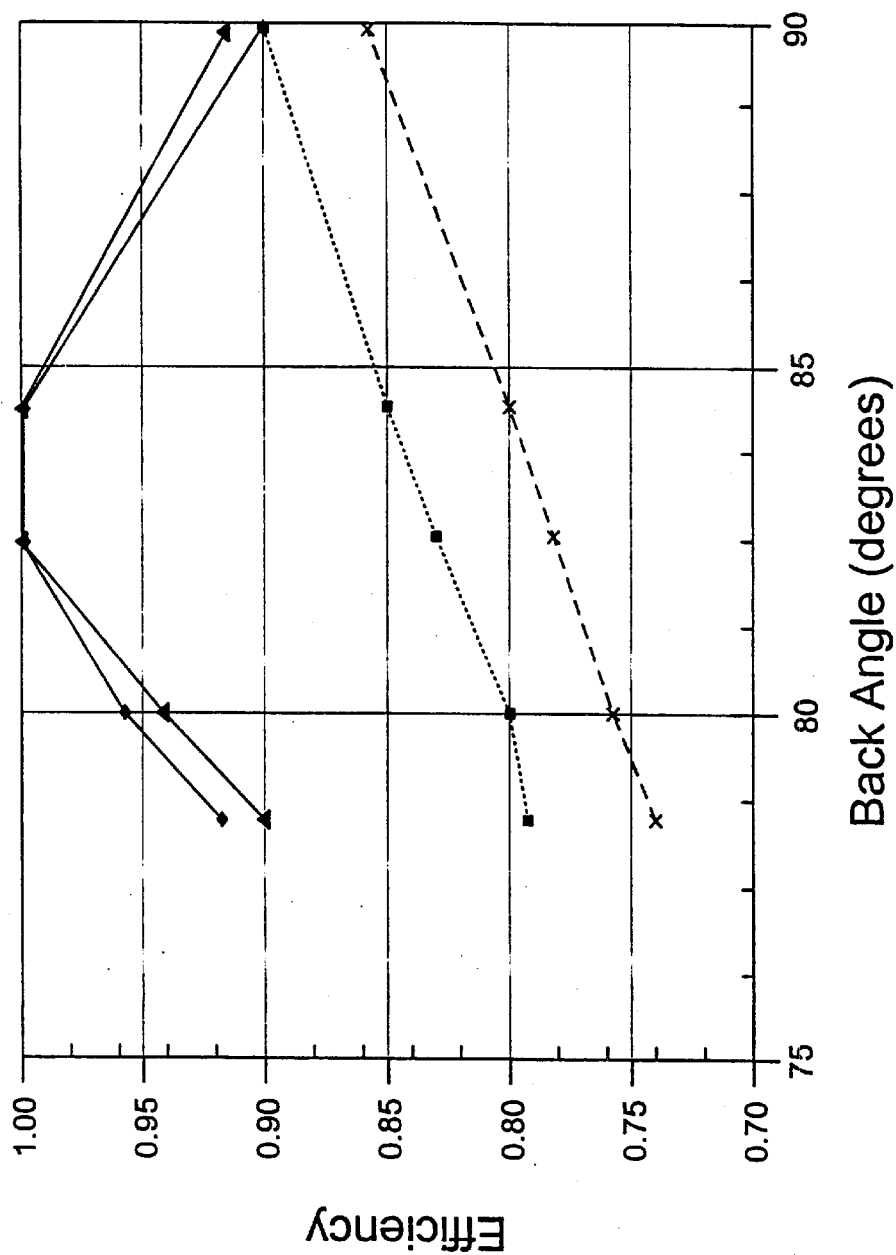
FIG. 9 shows the effect on efficiency in S and P polarization configurations of allowing the support walls to connect with the substrate non-normally.

The numerical results presented in FIGS. 2–8 were calculated for diffraction gratings that have the support walls connected with the substrate substantially norm ally. FIG. 9 shows that when the angle at which the support wall connects with the substrate (the "back angle"), is acute, the efficiency of the P-polarization configuration decreases sharply. The calculations were performed with the G-Solver package for a full-sawtooth grating having a grating density 1/d of 900 faces/mm and a blaze angle $\theta_b$ of 54.0°. As the figure shows, a decrease of the back angle from 90° results directly in a significant decrease in P-polarization diffraction efficiency. A decrease of the angle by about 10° causes an efficiency decrease of about 10%. While the S-polarization diffraction efficiency shows some improvement in the region between about 82 and 84°, it too drops off for more acute angles. If the back angle is obtuse, the diffraction efficiency is expected to be the same as it is for a right back angle since the reduction in boundary effects for P-polarized light is maintained. Accordingly, it is preferred that the back angle be approximately $\geq 90°$.

5. Grating Fabrication Process

Figure 10:
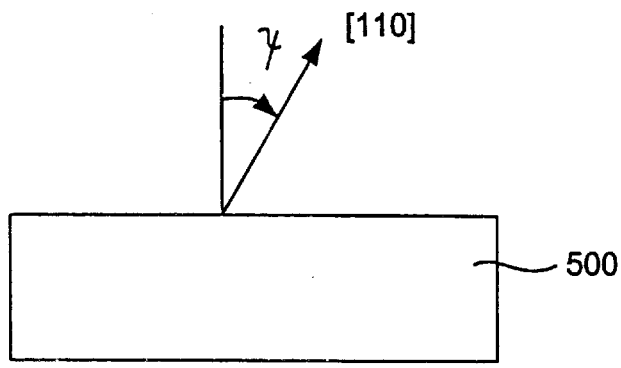
FIG. 10 shows the steps performed in one embodiment to fabricate the diffraction grating: part (a) shows a crystal surface with a normal that defines an angle ψ with respect to the [110] crystallographic direction; part (b) shows the formation of a first set of trenches using a crystalline-independent etching technique; part (c) shows the result of the depositing sacrificial material on the etched crystal surface; part (d) shows exposure of the underlying crystal surface at specific locations; part (e) shows the result of applying a crystalline-dependent chemical etchant at the exposed locations; and part (f) shows the resulting structure after dissolving the sacrificial material and agitating.
Figure 10:
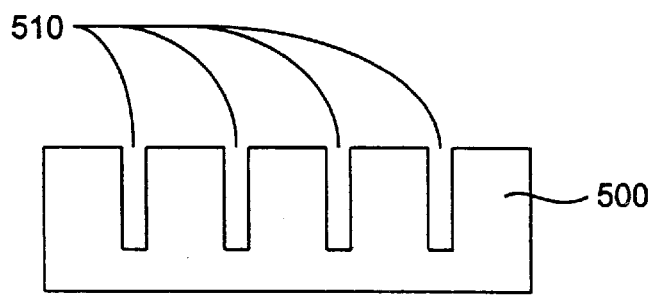
Figure 10:
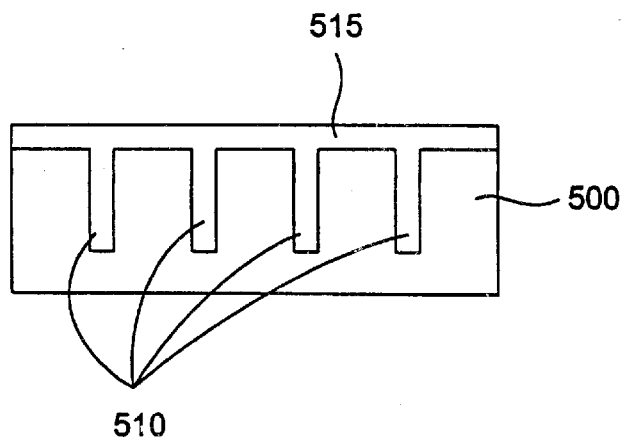
Figure 10:
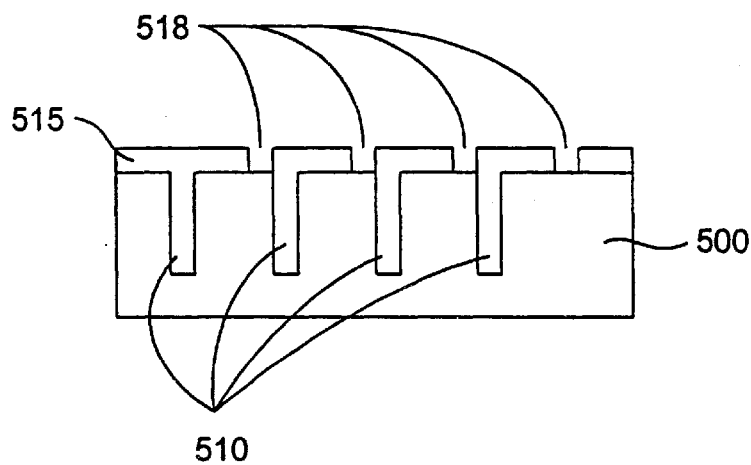
Figure 10:
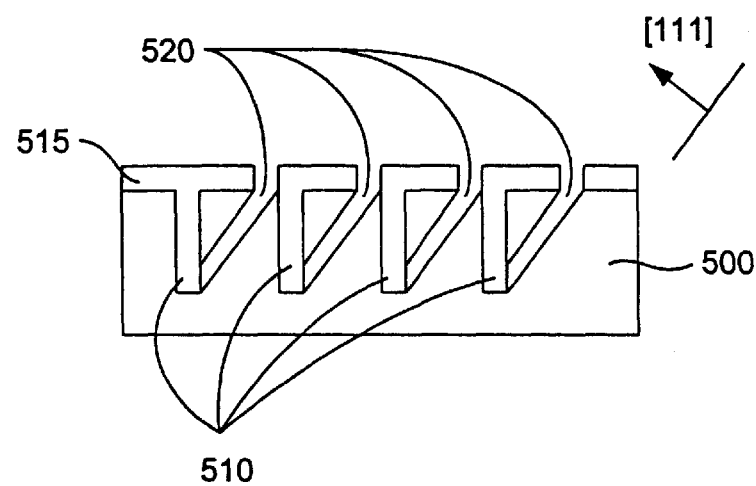
Figure 10:
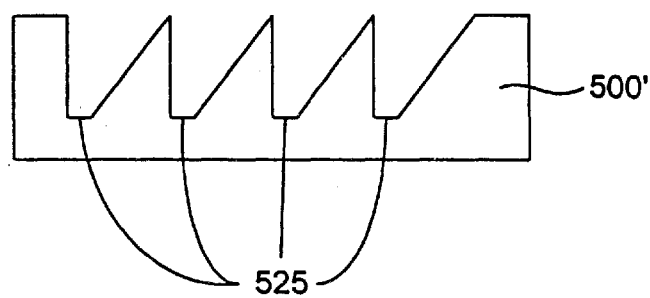

A process in accordance with embodiments of the present invention for fabricating diffraction gratings with the characteristics described above is illustrated in FIG. 10. The process combines both crystalline-independent and crystalline-dependent etching techniques while exploiting the crystalline characteristics of appropriate materials. Techniques that rely solely on crystalline-dependent etching techniques, such as described in U.S. Pat. No. 4,330,175, filed Jul. 17, 1979 by Fujii et al., which is herein incorporated by reference for all purposes, can only produce grating profiles narrowly limited by the crystallographic structure of the material used. The combination of crystalline-independent and crystalline-dependent techniques in accordance with the present invention permit the grating pitch and angle to be varied independently.

As shown in FIG. 10(a), the process begins with a suitable crystal surface 500 having a surface normal inclined at a tilt angle $\psi$ from an etch direction, such as from the [110] direction when the crystal surface is a silicon surface, where the notation [jkl] is used to denote the usual Miller indices. In one embodiment the crystal surface is a wafer. The tilt angle $\psi$ of the starting crystal surface 500 is chosen to be complementary to the desired blaze angle $\theta_b$ of the final diffraction grating. Thus, for embodiments of the grating with a blaze angle in the approximate range $54° \leq \theta_b \leq 56°$, the tilt angle is in the approximate range $34° \leq \psi \leq 36°$. Silicon is one material with crystallographic properties that permit such tilt angles and can be used with the combined crystalline-independent and crystalline-dependent etching process of the invention, although the use of any alternative material with suitable crystalline structure is also within the scope of the invention. In certain alternative embodiments, III–V or II–VI semiconductor materials such as GaAs, InP, or ZnSe may be used instead of a Group-IV semiconductor material.

A series of vertical trenches 510 are etched into the crystal surface 500, as shown in FIG. 10(b). The spacing of the trenches corresponds to the spacing of reflective faces in the resulting diffraction grating; accordingly, equally spaced vertical trenches 510 are etched for those embodiments in which a diffraction grating having equally spaced reflective faces is produced. The etching technique used to produce the vertical trenches 510 is a crystalline-independent technique, in the sense that its etch activity is irrespective of the crystalline structure of the starting crystal surface 500. One appropriate technique for producing the vertical trenches 510 is to identify the trench locations lithographically and then apply vertical reactive ion etching ("RIE"), a technique in which positively charged ions are accelerated towards the crystal surface 500. Alternative crystalline-independent techniques also suitable for etching the vertical trenches 510 include ion milling and deep RIE ("DRIE"). Both the vertical RIE and ion-milling techniques produce vertical trenches 510 with substantially straight walls. DRIE produces a trench with a characteristic inwards scalloping of the walls. Use of DRIE in this step results in a diffraction grating where the support walls 164 include this inwards scalloping feature; since the side walls are not optically important for the grating, such scalloping is not objectionable.

The etched crystal surface is subsequently coated with a sacrificial layer 515 as shown in FIG. 10(c). The sacrificial layer 515 is deposited so that it fills the bottoms of the vertical trenches 510, where it is used to prevent excessive etching of the crystal surface in the crystalline-dependent etch step described below (FIG. 10(e)). Those of skill in the art will appreciate that if the aspect ratio of the vertical trenches 510 is large, as may be desirable to limit the size of the mesas 525 described below, voids may form in the sacrificial layer 515 within the vertical trenches 510 during deposition. Such voids do not significantly affect the process adversely provided there is sufficient material at the bottom of the trenches to terminate the crystalline-dependent etch step (FIG. 10(e)). Appropriate materials for the sacrificial layer include oxides or nitrides such as $SiO_2$ or $Si_3N_4$.

The sacrificial layer 515 is subsequently patterned by etching it at locations that define the extent of the diffraction gratings reflective faces. In the illustration in FIG. 10(d), the etched portions 518 of the sacrificial layer 515 are formed adjacent to the vertical trenches 510. The depth of the vertical trenches 510 formed during the crystalline-independent etch (FIG. 10(b)) and the positions of the etched portions 518 of the sacrificial layer 515 are constrained so that they define parallel segments inclined with respect to the crystal surface. The specific portions of the sacrificial layer 515 are etched with any appropriate lithographic and etching technique, for example by using photoresist and RIE.

In FIG. 10(e) the effect of applying a crystalline-dependent etch through the patterned sacrificial layer 515 is shown. By using an etchant that preferentially etches along [110] orientations and not along [111] orientations, inclined trenches 520 are formed in the crystal. A suitable crystalline-dependent chemical etchant is KOH, which has an etching ratio between the [110] and [111] orientations that exceeds 600. The structure of a material such as silicon includes many crystallographic planes, leading to a concern that there may be interference with other of such planes when the crystalline-dependent etch is applied. The inventors have recognized, however, that with the particular crystallographic structure of silicon and similarly structured materials, the etching can be limited to the desired [110] orientations. As a result, the inclined trenches 520 are etched with negligible etching in undesirable directions. Alternative crystalline-dependent chemical etchants that may also be used with a silicon crystal in accordance with the invention include hydrazine and ethylene diamine pyrocatechol. The activity of the chemical etchant is stopped when it encounters the sacrificial layer 515 deposited within the vertical trenches 510.

After completion of the crystalline-dependent etching step, the crystal surface 500 is exposed to an etchant that dissolves the sacrificial layer and is agitated to release the remaining sacrificial layer portions and unattached pieces of the surface that may be discarded. The profile of the resulting micromachined crystal surface 500' is shown in FIG. 10(f). This micromachined crystal surface 500' may be used directly to produce the diffraction grating or may be used as a master for replication of diffraction gratings. When used directly, the mesas 525 that result from the crystalline-independent etching step produce the truncated sawtooth profile shown in FIG. 1(c). When used as a master, the resulting diffraction grating (which has a profile inverted from the micromachined crystal surface 500') has right-base triangles 160 that are truncated at the apex as a result of the mesas 525 in the master. Provided the size of this apical truncation is not too large, there are no significant adverse effects on the optical properties of the diffraction grating; the size of these mesas can be limited as desired by increasing the aspect ratio for the vertical trenches 510. Whether the micromachined crystal surface 500' is used directly or as a master, the grating is coated with a reflective overlay, such as gold, which may be adhered to the grating with an adhesion layer such as titanium or chrome.

Figure 11:
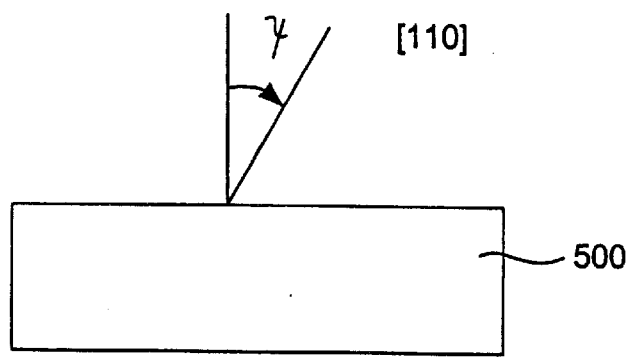
FIG. 11 shows the steps performed in another embodiment to fabricate the diffraction grating: part (a) shows a crystal surface with a normal that defines an angle ψ with respect to the [110] crystallographic direction; part (b) shows the formation of a first set of trenches using a crystalline-independent etching technique; part (c) shows the result of depositing sacrificial material on the etched crystal surface; part (d) shows the result of chemical and mechanical polishing to remove the sacrificial material from the crystal surface; part (e) shows the result of subsequently exposing the crystal to a crystalline-dependent chemical etchant; and part (f) shows the resulting structure after removal of the remaining sacrificial material.
Figure 11:
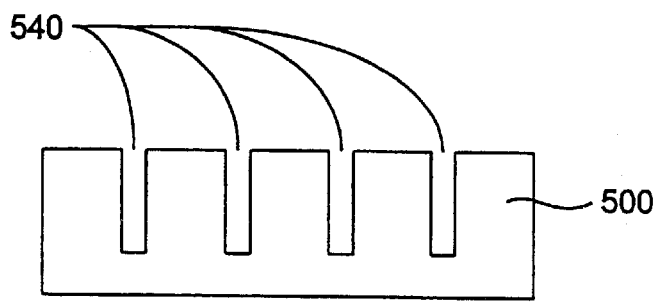
Figure 11:
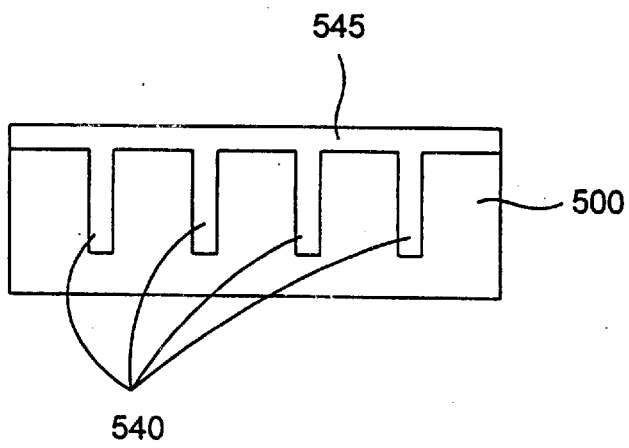
Figure 11:
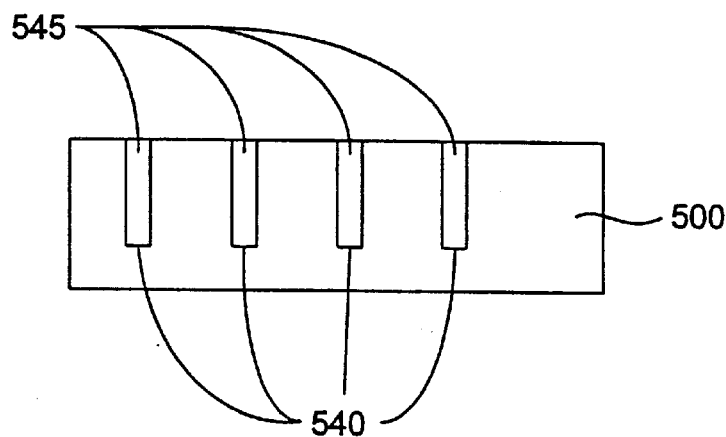
Figure 11:
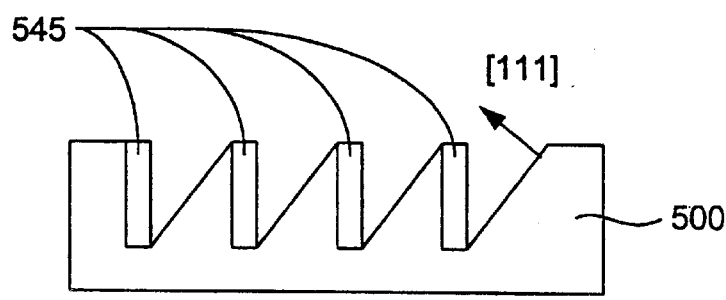
Figure 11:

This specific etchant crystalline dependence is also used in alternative embodiments. In one such alternative embodiment, illustrated in FIG. 11, the initial steps are similar. First, as shown in FIG. 11(a), the process begins with a suitable starting crystal surface 500 having a surface normal inclined at tilt angle $\psi$ from the [110] direction. As for the previous embodiment, a series of vertical trenches 540 are etched into the crystal surface 500 with a crystalline-independent technique such as RIE [FIG. 11(b)]. A sacrificial material 545, such as $SiO_2$ or $Si_3N_4$, is subsequently deposited so as to fill the trenches [FIG. 11(c)]. In this embodiment, however, the top of the sacrificial layer 545 overlying the crystal surface 500 is removed substantially completely after the deposition step, producing the structure shown in FIG. 11(d). One technique that may be used to remove the material in this way is chemical and mechanical polishing (CMP). As can be seen in FIG. 11(d), this still leaves the material deposited within the vertical trenches 510 to act as an etch stop. Application of the chemical crystalline-dependent etch as shown in FIG. 11(e) acts as before to etch preferentially along [110] orientations and not along [111] orientations. Termination of the crystalline-dependent etch by the deposited sacrificial material 545 thus produces the inclined surfaces. Subsequent removal of the remaining sacrificial material 545 to produce the micromachined surface 500" shown in FIG. 11(f) is optional. Either the surface shown in FIG. 11(e) or the surface shown in FIG. 11(f) may be used as described above to complete production of the diffraction grating.

In another alternative embodiment, the sacrificial layer 515 is not deposited uniformly over the crystal surface 500; instead, such material is deposited within each of the trenches at a sufficient depth to act as an etch stop when the crystalline-dependent chemical etch is applied. In still another alternative embodiment, the crystal surface 500 is replaced with a silicon-on-insulator ("SOI") layered structure, in which an insulator layer (e.g., an oxide layer) lies intermediate between underlying bulk silicon and an overlying epitaxial silicon layer. The crystalline-independent etch of the vertical trenches 510 is performed down to the insulator layer. As before, the vertical trenches are protected by filling them with sacrificial material, and the process is otherwise performed as previously described. This embodiment simplifies etching the vertical trenches 510 to substantially equal depths.

Use of a crystalline-dependent chemical etchant produces an atomically smooth surface along the inclined trench 520, a feature that is beneficial to the optical characteristics of the diffraction grating because the reflective faces 112 are formed on this surface. Other techniques to form the reflective faces, such as ion-beam etching (as described in, e.g., U.S. Pat. No. 5,279,924, filed Jul. 1, 1992 by Sakai et al., which is incorporated herein by reference for all purposes) fail to produce atomically smooth surfaces so that the optical characteristics of the diffraction grating are poorer. Another consequence of ion-beam etching, such as shown in FIGS. 2–5 of U.S. Pat. No. 5,279,924, is an undesirable curvature of the grating profile at the intersection of the support walls and reflective faces.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for fabricating a diffraction grating, the method comprising:
   (a) forming a first plurality of parallel trenches in a crystal surface with a crystalline-independent technique; and
   (b) chemically etching a second plurality of parallel trenches in the crystal surface with a crystalline-dependent etchant, the second plurality of parallel trenches being inclined with respect to the first plurality of trenches and each of such second plurality of trenches joining at least one of such first plurality of trenches, wherein the first and second pluralities of trenches have nonoverlapping openings in the crystal surface.

2. The method according to claim 1 wherein the crystal surface is a wafer.

3. The method according to claim 1 wherein the crystalline-independent technique comprises reactive ion etching.

4. The method according to claim 1 wherein the crystalline-independent technique comprises ion milling.

5. The method according to claim 1 wherein the crystalline-independent technique comprises deep reactive ion etching.

6. The method according to claim 1 wherein the crystal surface includes a silicon surface whose normal is oriented at a nonzero tilt angle with respect to a [110] crystallographic direction and wherein the crystalline-dependent etchant preferentially etches along [110] orientations of silicon.

7. The method according to claim 6 wherein the crystalline-dependent etchant comprises KOH.

8. The method according to claim 6 wherein the crystalline-dependent etchant comprises hydrazine.

9. The method according to claim 6 wherein the crystalline-dependent etchant comprises ethylene diamine pyrocatechol.

10. The method according to claim 6 wherein the tilt angle is between 30° and 40°.

11. The method according to claim 10 wherein the tilt angle is between 34° and 36°.

12. The method according to claim 6 wherein the first plurality of trenches is formed approximately perpendicular to the silicon surface.

13. The method according to claim 6 further comprising depositing sacrificial material in each of the first plurality of trenches before performing the step of chemically etching the second plurality of parallel trenches, the sacrificial material acting as an etch stop to the crystalline-dependent etchant.

14. The method according to claim 13 wherein the sacrificial material comprises an oxide or a nitride.

15. The method according to claim 14 wherein the oxide or nitride is a silicon oxide or a silicon nitride.

16. The method according to claim 13 wherein the step of depositing sacrificial material comprises substantially filling each of the first plurality of trenches and coating the silicon surface with the sacrificial material.

17. The method according to claim 16 further comprising exposing specific regions of the silicon surface and wherein the step of chemically etching the second plurality of trenches comprises applying the crystalline-dependent etchant to the exposed regions.

18. The method according to claim 17 wherein the step of exposing specific regions of the silicon surface comprises lithographically patterning the coating of sacrificial material and applying an etchant.

19. The method according to claim 17 wherein the step of exposing specific regions of the silicon surface comprises chemically and mechanically polishing the silicon surface.

20. The method according to claim 13 further comprising:
    (a) removing the sacrificial material; and
    (b) depositing a reflective coating on the etched crystal surface.

21. The method according to claim 13 further comprising:
    (a) removing the sacrificial material; and
    (b) using the etched crystal surface as a master for batch fabrication of the diffraction grating.

22. The method according to claim 1 wherein the crystal surface comprises a silicon-on-insulator (SOI) structure, the SOI structure including an insulator layer that defines a bottom to each of the first plurality of trenches and acts as an etch stop to the crystalline-dependent etchant.

23. A method for fabricating a diffraction grating, method comprising:
    (a) forming a plurality of parallel trenches in a crystal surface with a crystalline-independent technique;
    (b) depositing sacrificial material in each of the plurality of trenches;
    (c) removing excess sacrificial material from the crystal surface; and
    (d) chemically etching the crystal surface with a crystalline-dependent etchant.

24. The method according to claim 23 wherein the crystal surface is a wafer.

25. The method according to claim 23 wherein the crystalline-independent technique comprises reactive ion etching.

26. The method according to claim 23 wherein the crystalline-independent technique comprises ion milling.

27. The method according to claim 23 wherein the crystalline-independent technique comprises deep reactive ion etching.

28. The method according to claim 23 wherein the crystal surface includes a silicon surface whose normal is oriented at a nonzero tilt angle with respect to a [110] crystallographic direction and wherein the crystalline-dependent etchant preferentially etches along [110] orientations of silicon.

29. The method according to claim 28 wherein the crystalline-dependent etchant comprises KOH.

30. The method according to claim 28 wherein the crystalline-dependent etchant comprises hydrazine.

31. The method according to claim 28 wherein the crystalline-dependent etchant comprises ethylene diamine pyrocatechol.

32. The method according to claim 28 wherein the tilt angle is between 30° and 40°.

33. The method according to claim 32 wherein the tilt angle is between 34° and 36°.

34. The method according to claim 28 wherein the plurality of trenches is formed approximately perpendicular to the silicon surface.

35. The method according to claim 28 wherein the sacrificial material comprises an oxide or a nitride.

36. The method according to claim 35 wherein the oxide or nitride is a silicon oxide or a silicon nitride.

37. The method according to claim 23 further comprising dissolving substantially all of the sacrificial material after the step of chemically etching the crystal surface with a crystalline-dependent etchant.

38. A method for fabricating a diffraction grating, the method comprising:
    (a) forming a first plurality of parallel trenches in a silicon crystal with a crystalline-independent ion-bombardment technique,
        the silicon wafer having a surface normal that defines a 34°–36° tilt angle with respect to a [110] crystallographic direction of the silicon crystal and
        the first plurality of parallel trenches being approximately perpendicular to that surface;
    (b) thereafter, depositing sacrificial material to substantially fill each of the first plurality of trenches and to coat the crystal surface;
    (c) thereafter, lithographically patterning the sacrificial material to expose specific regions of the crystal surface;
    (d) thereafter, applying a crystalline-dependent chemical etchant to the exposed regions to etch a second plurality of parallel trenches,
        the crystalline-dependent chemical etchant preferentially etching along [110] orientations of silicon
        and the sacrificial material deposited in the first plurality of trenches acting as an etch stop; and
    (e) thereafter, removing the sacrificial material.

39. The method according to claim 38 wherein the crystalline-independent ion-bombardment technique comprises reactive ion etching and the crystalline-dependent chemical etchant comprises KOH.

* * * * *